United States Patent

Voth

[15] 3,699,820
[45] Oct. 24, 1972

[54] CHAIN ADJUSTER FOR ELEVATING SCRAPER

[72] Inventor: James W. Voth, Springfield, Ill.

[73] Assignee: Allis-Chalmers Manufacturing Company, Milwaukee, Wis.

[22] Filed: March 19, 1970

[21] Appl. No.: 126,012

[52] U.S. Cl. .........................................74/242.14 R
[51] Int. Cl. ..............................................F16h 7/10
[58] Field of Search ..74/242.14 R, 242.11 A, 242.12

[56] References Cited

UNITED STATES PATENTS

| 3,581,588 | 6/1971 | Etefield | 74/242.14 R |
| 3,444,750 | 5/1969 | Stuller | 74/242.14 R |
| 3,098,397 | 7/1963 | Schaefer | 74/242.14 R |
| 3,463,022 | 8/1969 | Miller | 74/242.14 R X |
| 3,477,766 | 11/1969 | Linsay | 74/242.14 R X |
| 3,568,569 | 3/1971 | Haley | 74/242.14 R X |

*Primary Examiner*—Leonard H. Gerin
*Attorney*—Charles L. Schwab, Robert B. Benson and Kenneth C. McKivett

[57] ABSTRACT

An adjuster for an endless chain or belt mechanism includes a removable ram interposed between frame and tensioning members. Releasable fastening means not only adjustably secure the tensioning member relative to the support member but also releasably fasten the cylinder element of the ram to one of the members. Upon loosening of the fastening means, the ram can be expanded by introduction of pressure fluid to selectively adjust the position of the tension member relative to the support member.

9 Claims, 4 Drawing Figures

PATENTED OCT 24 1972 3,699,820

Inventor
James W. Voth
By Charles L. Schwab
Attorney

CHAIN ADJUSTER FOR ELEVATING SCRAPER

In an endless chain or belt mechanism, it is customary to provide for adjustment to establish proper tension for optimum operation of the mechanism and to compensate for wear. In heavy duty endless belt mechanisms, such as the elevating mechanism of an earthmover, it has been found desirable to utilize a hydraulic ram to position the tensioning member since to do so manually becomes difficult or impossible. Such a device is shown in H. E. Stuller's U.S. Pat. No. 3,444,750, Adjustor Mechanism, issued May 20, 1969.

It is an object of the present invention to provide a removable hydraulic ram for adjusting the tensioning member of an endless belt mechanism which is low in cost and easy to install and service.

It is also an object of the present invention to provide a tensioning arrangement which lends itself to use as an optional item suitable for field installation.

It is a further object of the present invention to provide a hydraulic ram for adjusting the tensioning member relative to a support member which is releasably secured by releasable fastening means which also serve to hold the tensioning member and support member in assembly.

These and other objects and advantages of the present invention will be apparent from the following description when read in conjunction with the drawings in which.

Figure 1:
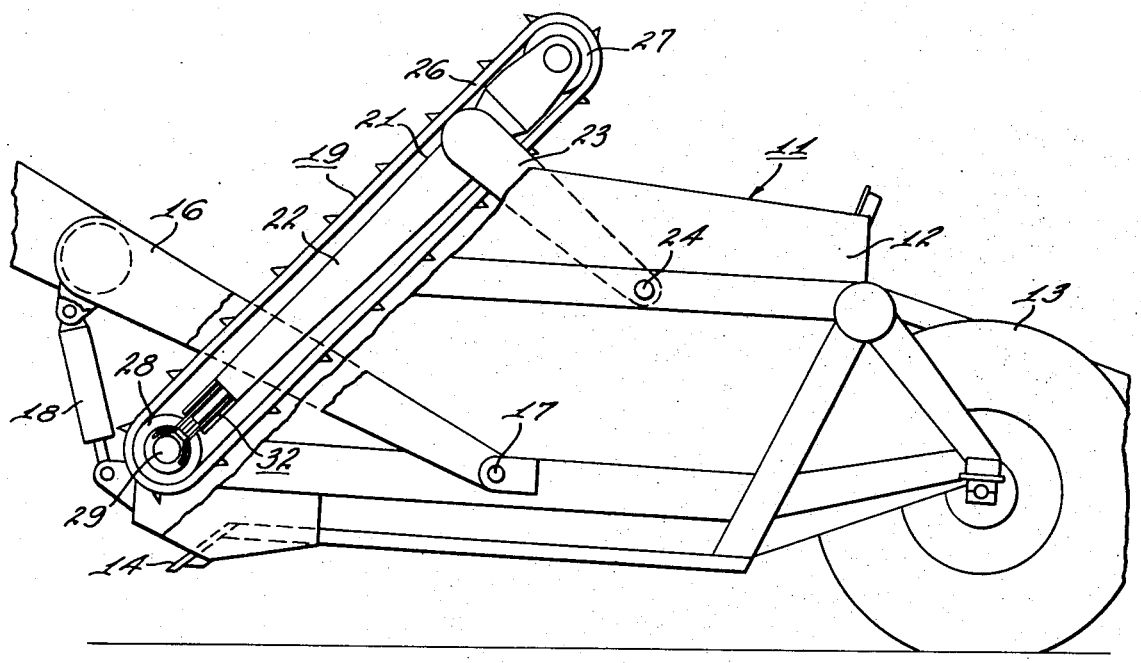
FIG. 1 is a side view of an earthmover utilizing an endless belt elevating mechanism in which the present invention is incorporated.

Referring to FIG. 1, an elevating scraper 11 is illustrated which includes a bowl 12 supported at its rear end by a pair of wheels 13, only one of which is shown. The bowl 12 carries a cutting edge 14 at its forward lower end, and a draft frame 16 is pivotally connected to the bowl 12 on a transverse pivot axis 17. The draft frame 16 is connected to a tractor, not shown, in a conventional manner. A pair of hydraulic jacks 18, only one of which is shown, interconnect the front end of the scraper bowl 12 and the draft frame 16 and serve on contraction and expansion to raise and lower the cutting edge 14. An elevating mechanism 19 is provided at the forward end of the bowl 12. As is well known in the art, the endless belt or chain mechanism 26 is rotated in a counterclockwise direction as viewed in FIG. 1 by motor means, not shown, to assist moving the excavated material from the cutting edge into the interior of the bowl. The elevating mechanism includes a support frame 21 which includes a pair of forwardly extending support members 22 and a pair of rearwardly extending legs 23 pivotally connected to the bowl side walls on a transverse axis 24. The endless chain 26 is carried by sprocket and idler components 27, 28.

Figure 3:
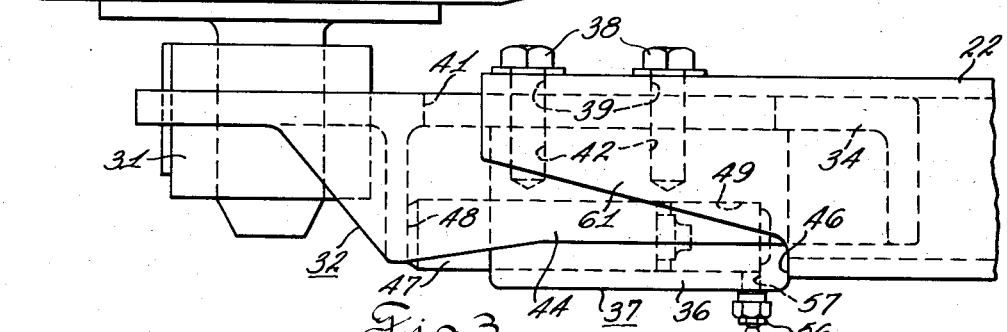
FIG. 3 is an enlarged top view of the adjusting mechanism of the present invention.
Figure 2:
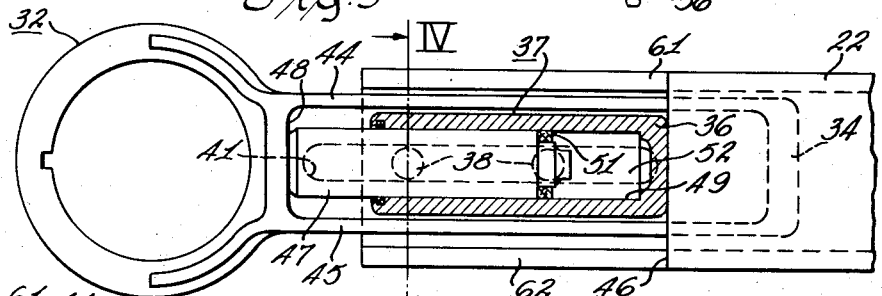
FIG. 2 is an enlarged side view of the tensioning member, support member and hydraulic ram with the ram cylinder shown in section for illustration purposes.
Figure 4:
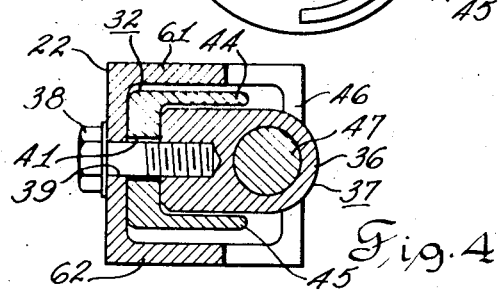
FIG. 4 is a section view taken along the line IV—IV in FIG. 2.

As shown in FIGS. 1 and 3, the idlers are mounted on a transverse shaft 29, one end of which is journaled in a bearing 31 carried by a tensioning member 32. Referring also to FIGS. 2 and 4, the tensioning member 32 includes a rearwardly extending portion 34 which is slidably disposed between the forward end of support member 22 and the cylinder element 36 of a ram 37. The tensioning member 32 is slidably connected to the support member 22 by a pair of releasable fastening means in the form of cap screws 38, which have shank portions extending through holes 39 in support member 22 and through an elongated slot 41 in the rearwardly extending portion 34 of the tensioning member 32. The cap screws 38 are screwed into drilled and tapped openings 42 in ram cylinder element 36. The ram 37 nests between a pair of spaced reinforcing flanges 44, 45 on the tensioning member 32 which in turn are disposed between spaced walls 61, 62 of the support member 22.

The closed end of the cylinder element 36 abuts a shoulder 46 on the support member 22, and the piston element 47 of the ram 37 extends forwardly into abutting, thrust transmitting relation to a shoulder 48 on the tensioning member 32. The piston element 47 extends rearwardly into a cylindrical cavity 49 of the cylinder element 36 and carries an annular seal 51 on its interior end. When it is desired to adjust the belt tensioning member 32 forwardly in relation to the support member 22, the cap screws are loosened, thereby permitting the chain tensioning member 32 to slide forwardly when additional grease is pumped into the interior cavity 52 of the ram 37 by way of a conventional grease fitting 56 which has a threaded shank portion in threaded engagement with a drilled and tapped opening 57 in the cylinder element 36. After the ram 37 has been expanded, thereby forcing the tensioning member 32 forwardly through the thrust reaction of the cylinder element 36 against the shoulder 46 of the support member 22 and the piston element 47 against the shoulder 48 on the tensioning member, the cap screws 38 may once again be tightened to secure the tensioning member 32, support member 22 and cylinder element 36 in a rigid assembly. Thus, it will be seen that the cap screws 38 serve to hold the cylinder element 36 in a fixed axial position and that the cylinder element 36 serves as a nut for the cap screws which upon tightening will serve to rigidly secure the support member 22 and belt tensioning member 32 against relative axial sliding movement.

The belt adjusting mechanism of this invention possesses a number of advantageous characteristics. For instance, the ram 37 can be completely removed from the assembly if need arises, such as to replace seals therein. By merely removing the cap screws 38, it is possible to remove the ram outwardly in an assembled condition. It is also apparent that the fastening means for securing the ram 37 to the support member 22 also serve to maintain the belt tensioning member and support member in rigid assembly at selected positions of the adjustment.

The embodiments of the invention in which an exclusive property or privilege is claimed are defined as follows:

1. An adjuster mechanism for an endless belt comprising:
    a support member for said endless belt,
    a belt tensioning member,
    a ram interposed between said members, including cylinder and piston elements, and mounting means slidably connecting said belt tensioning member to said support member including a releasable fastening element releasably securing said tensioning member to said support member and releasably securing said cylinder element to one of said members, said piston element being in thrust transmitting relation to the other of said members.

2. The combination of claim 1 wherein said tensioning member includes a portion disposed between said support member and said cylinder element.

3. The combination of claim 1 wherein said cylinder element has a closed end in axially abutting relation to a portion of said one member.

4. The combination of claim 1 wherein said one member is said support member.

5. The combination of claim 1 wherein said other member has an elongated slot and said releasable fastening element extends through said slot.

6. The combination of claim 5 wherein said one member is said support member.

7. The combination of claim 6 wherein said cylinder member has a closed end in axially abutting relation to a portion of said one member.

8. The combination of claim 7 wherein said tensioning member includes a portion disposed between said support member and said cylinder element.

9. The combination of claim 8 wherein said releasable fastening element is a cap screw threadedly engaging a threaded opening in said cylinder element.

* * * * *